United States Patent [19]

Sakurai

[11] Patent Number: 5,236,759

[45] Date of Patent: Aug. 17, 1993

[54] HOUSING FOR A METER FOR A BICYCLE OR LIKE VEHICLE HAVING ULTRASONICALLY JOINED COVERS ENCLOSING A LIQUID CRYSTAL

[75] Inventor: Nobuo Sakurai, Itami, Japan

[73] Assignee: Cat Eye Co., Ltd., Osaka, Japan

[21] Appl. No.: 837,849

[22] Filed: Feb. 18, 1992

[30] Foreign Application Priority Data

Feb. 22, 1991 [JP] Japan .............................. 3-008388[U]

[51] Int. Cl.$^5$ .............................................. B32B 3/00
[52] U.S. Cl. ...................................... 428/76; 428/13;
428/192; 428/542.8; 428/1; 264/249; 156/73.1
[58] Field of Search ................ 428/76, 13, 192, 542.8,
428/1; 156/73.1; 136/175; 264/240

[56] References Cited

U.S. PATENT DOCUMENTS

3,775,189 11/1973 Jaggard ............................... 156/73.1
4,259,419 3/1981 Uba et al. ............................ 156/73.1
4,572,753 2/1986 Bach ................................... 156/73.1

Primary Examiner—Patrick J. Ryan
Assistant Examiner—Abraham Bahta
Attorney, Agent, or Firm—Allegretti & Witcoff, Ltd.

[57] ABSTRACT

Two-wheeled vehicle parts in accordance with the present invention includes: a first cover having a functional element therein and having a cross-section of a shape to cover the functional element, a second cover corresponding to the first cover so that an end surface of the second cover can be engaged with that of the first cover, and having a cross-section of a shape to cover the functional element, and a projection formed on either the end surface of the first cover or that of the second cover. The first cover and the second cover have respective end surfaces connected with each other through the projection by ultrasonic welding.

8 Claims, 8 Drawing Sheets

HOUSING FOR A METER FOR A BICYCLE OR LIKE VEHICLE HAVING ULTRASONICALLY JOINED COVERS ENCLOSING A LIQUID CRYSTAL

BACKGROUND OF THE INVENTION

1. Field of the Invention

The present invention relates to parts for two-wheeled vehicles and, more particularly, to two-wheeled vehicle parts incorporating a functional element in a speedometer or the like.

2. Description of the Background Art

Recently, speedometers are sometimes attached to bicycles in order to readily know travel speed, travel distance or the like of the bicycles.

Figure 9:
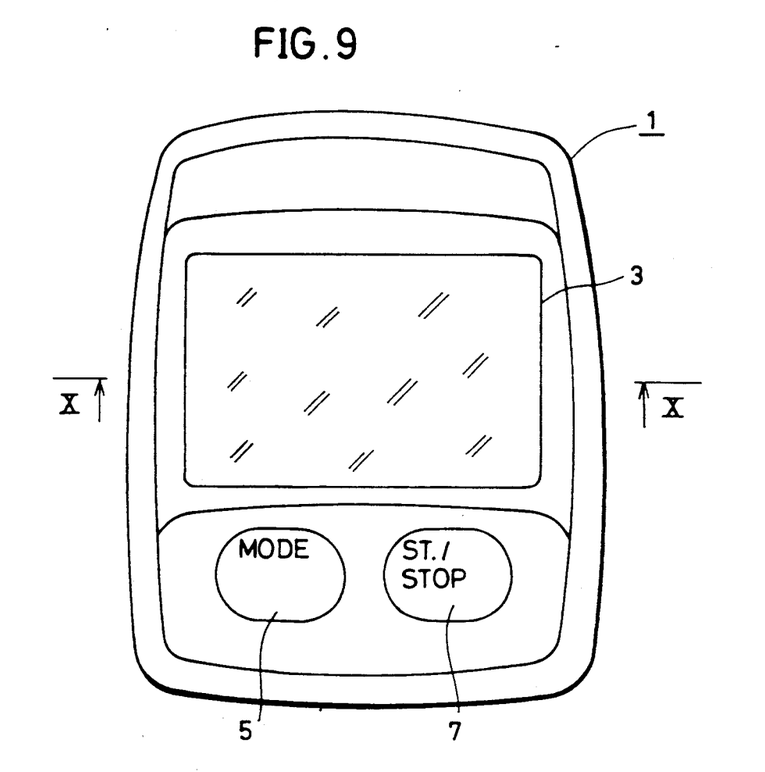
FIG. 9 is a plan view of a speedometer as conventional parts for a bicycle.
Figure 10:
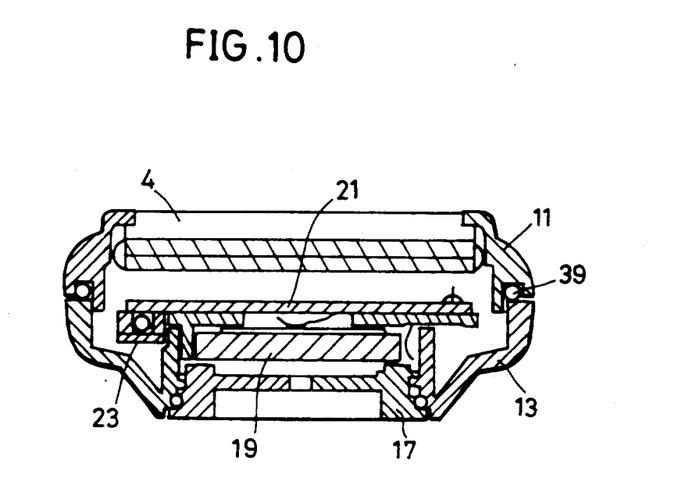
FIG. 10 is a sectional view taken along the line X—X of FIG. 9.

FIG. 9 is a plan view showing structure of such a speedometer; FIG. 10 is a sectional view taken along the line X—X of FIG. 9; and FIG. 11 is a rear view of the speedometer of FIG. 9.

The structure of the speedometer will now be described with reference to FIGS. 9-11.

A display portion 3 in which a liquid crystal display (LCD) is made through a lens 4 is formed in a central portion of a front surface of the speedometer. A mode switch 5 for switching various types of measuring modes and a start/stop switch 7 for switching the start and the stop of measurement are formed in a lower portion of the speedometer. Speedometer 1 comprises a lower cover 13 for covering a portion where such a functional element as a crystal oscillator 23 is attached to a printed circuit board 21, and an upper cover 11 having display portion 3 attached thereto. In lower cover 13, a bracket groove 45 that is slidably engaged with a bracket (not shown) attached to component parts such as a handle or the like of a bicycle is formed. A battery cover 17 that is freely opened or closed for use in attachment of a battery 19 is formed in the center of lower cover 13. End surfaces of upper cover 11 and lower cover 13 correspond to each other over their entire circumferences. An O ring 39 attached to a groove formed in upper cover 11 allows an attachment of upper cover 11 and lower cover 13 by sealing. In this state, by fastening screws 41 set at four corners of lower cover 13, the inside of the speedometer is protected from being affected by water drops or the like from the outside by action of the O ring.

Figure 11:
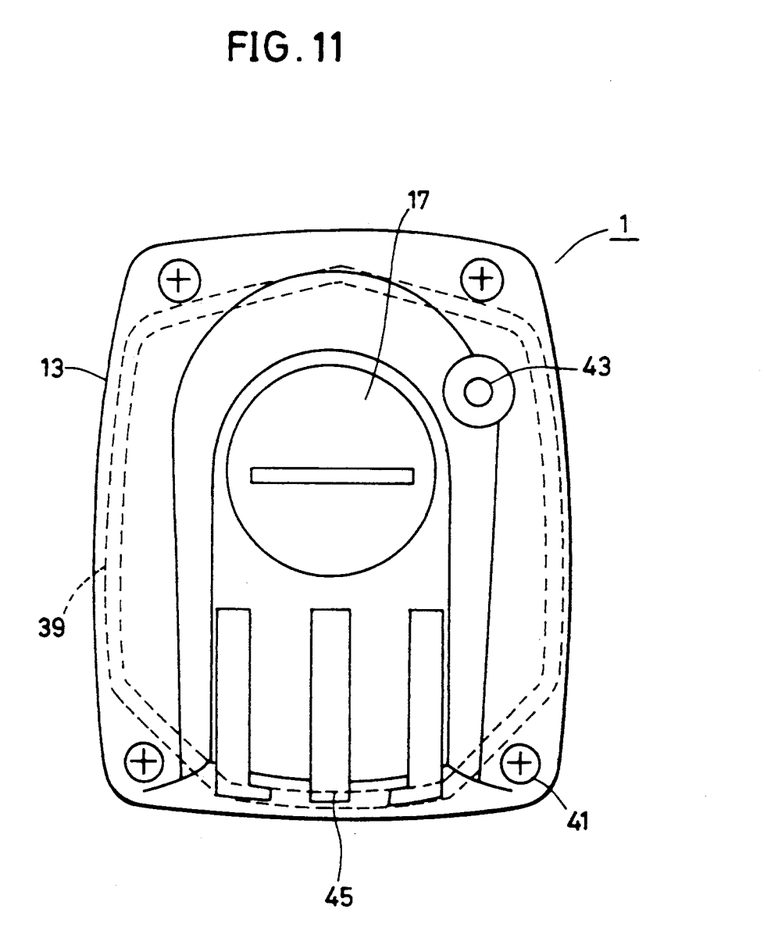
FIG. 11 is a rear view of the speedometer of FIG. 9.

In the above-described conventional two-wheeled parts, O rings 39 must be attached on the entire circumference, and screws 41 must be attached to the external four corners, as also shown in FIG. 11. Thus, a complicated manufacture is inevitably required to process attachment portions of the O rings, and two-wheeled vehicle parts must be unnecessarily larger in order to obtain attachment portions for screws 41 at the four corners.

SUMMARY OF THE INVENTION

One object of the present invention is to provide parts for a two-wheeled vehicle which can be made smaller in size.

Another object of the present invention is to provide parts for a two-wheeled vehicle, the inside of which can easily and securely be protected from the outside by sealing.

In order to accomplish the foregoing objects, parts for a two-wheeled vehicle in accordance with the present invention includes: a first cover having a functional element therein and having a cross-section in the form of covering the functional element; a second cover corresponding to the first cover so that an end surface of the second cover can be engaged with that of the first cover, and having a cross-section in the form of covering the functional element; and a projection formed in either the end surface of the first cover or that of the second cover, wherein the first cover and the second cover are connected to each other through the projection by ultrasonic welding.

In the two-wheeled vehicle parts thus structured, the first cover and the second cover are connected to each other through the projection by ultrasonic welding, resulting in small-size parts for a two-wheeled vehicle having a higher sealing performance.

The foregoing and other objects, features, aspects and advantages of the present invention will become more apparent from the following detailed description of the present invention when taken in conjunction with the accompanying drawings.

BRIEF DESCRIPTION OF THE DRAWINGS

There is shown in the attached drawing a presently preferred embodiment of the present invention, wherein like numerals in the various views refer to like elements, and where.

DESCRIPTION OF THE PREFERRED EMBODIMENTS

Figure 1:
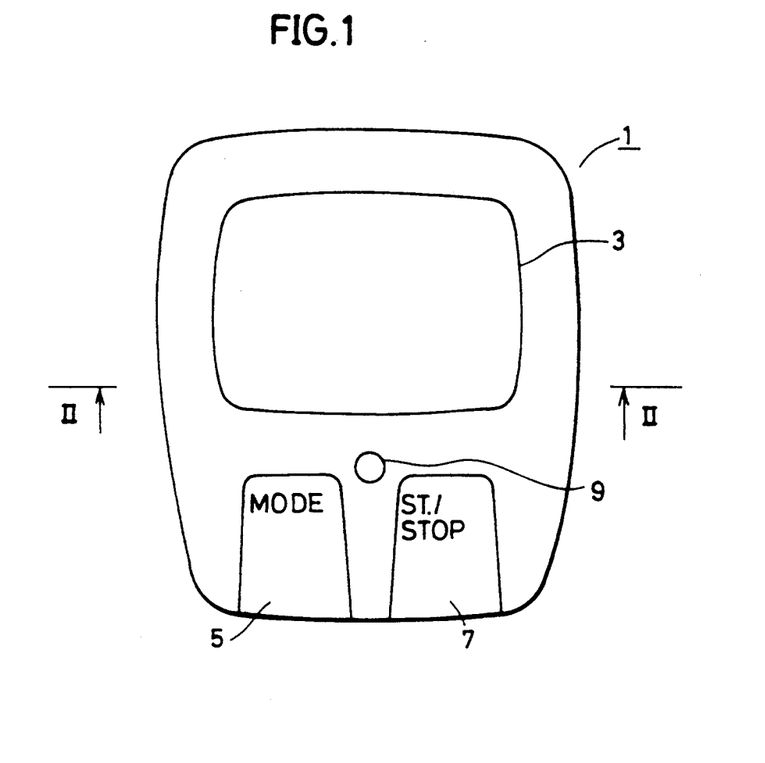
FIG. 1 is a plan view of two-wheeled vehicle parts according to one embodiment of the present invention.
Figure 2:
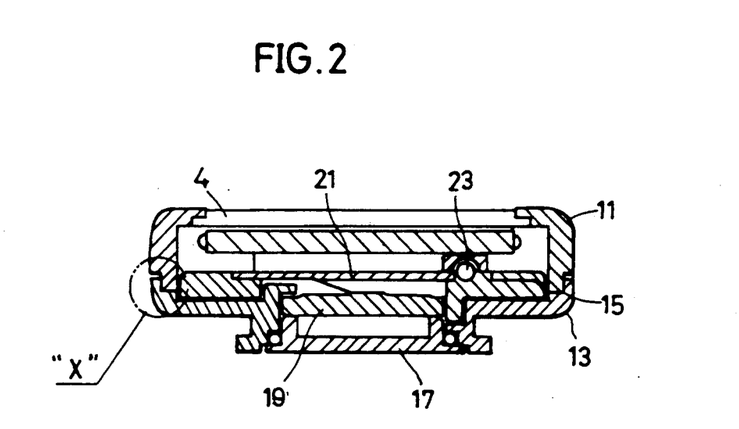
FIG. 2 is a sectional view taken along the line II—II of FIG. 1.
Figure 3:
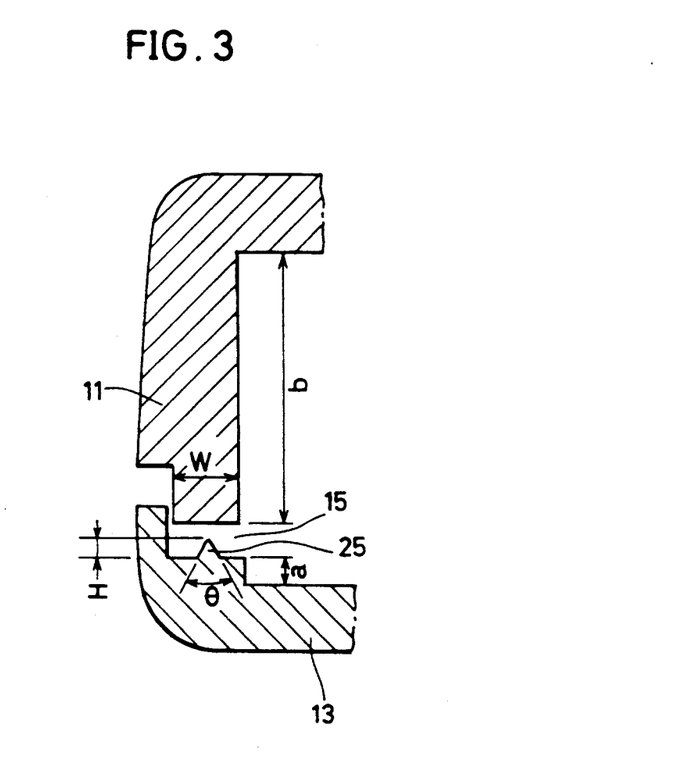
FIG. 3 is an enlarged view of an "X" portion of FIG. 2.

FIG. 1 is a plan view of a speedometer according to one embodiment of the present invention; FIG. 2 is a sectional view taken along the line II—II of FIG. 1; and FIG. 3 is an enlarged view of an "X" portion of FIG. 2.

Structure of the speedometer will now be described with reference to FIGS. 1-3.

A plane structure of a speedometer 1 is basically the same as that of FIG. 9 shown in the conventional example. More specifically, in a central portion of speedometer 1 is formed a display portion 3 in which a liquid crystal display or the like is made through a lens 4; in a lower portion of the speedometer is formed a mode switch 5 for switching various types of measurement modes; and in a right hand portion thereof is formed a start/stop switch 7 for controlling the start and the stop of measurement. A reset unit 9 for resetting a measurement display of the speedometer is provided between display portion 3 and mode switch 5 and start/stop switch 7. Like the conventional example, speedometer 1 includes an upper cover 11 and a lower cover 13. A printed circuit board 21 having such a functional element as a crystal oscillator 23 mounted thereon is attached to upper cover 11. A battery cover 17 that opens and closes when a battery 19 is entered and taken out is formed below lower cover 13. In this embodiment, however, there are provided neither screws for attaching upper cover 11 and lower cover 13 together nor 0 rings for allowing a sealed state of these covers. Instead, in order that the end surface of upper cover 11 and that of lower cover 13 are firmly connected to each other, a projection 25 with a triangular cross-section is formed on the end surface of lower cover 13. When upper cover 11 and lower cover 13 are provided with ultrasonic oscillation, with the end surface of upper cover 11 and projection 25 formed on the end surface of lower cover 13 being mutually pressed, projection 25 and the end surface of upper cover 11 are ultrasonic-welded.

Figure 4:
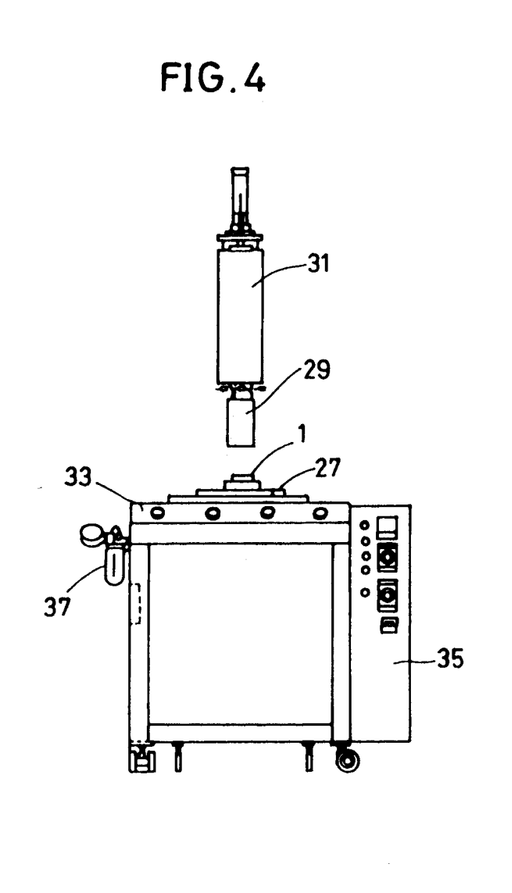
FIG. 4 is a front view of an ultrasonic welding machine employed in the one embodiment of the present invention.
Figure 5:
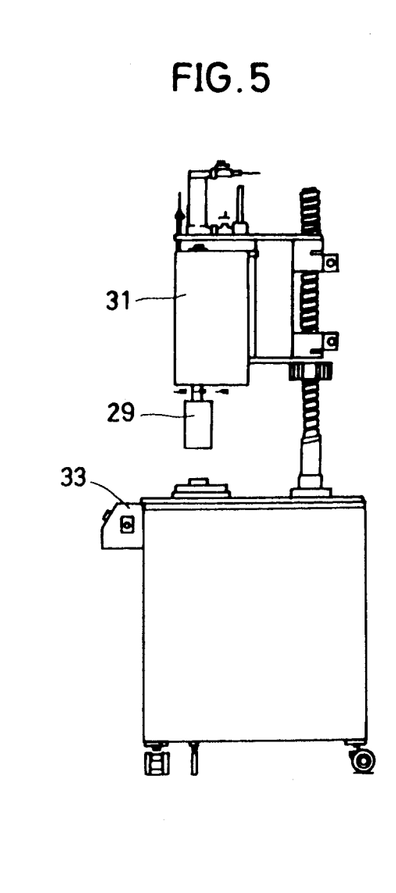
FIG. 5 is a side view of the ultrasonic welding machine of FIG. 4.

FIG. 4 is a front view of an ultrasonic welding machine employed in the one embodiment of the present invention; and FIG. 5 is a side view thereof.

Referring to FIGS. 4 and 5, a receiving jig 27 to which speedometer 1 is attached is formed on a top surface of the welding machine. A concavity conforming to the shape of lower cover 13 of the speedometer is formed in the receiving jig. An oscillation unit 31 for providing various types of oscillations is attached to an upper portion of the welding machine, and a tool horn 29 is attached to a tip end of oscillation unit 31. A concavity corresponding to the shape of upper cover 11 of speedometer 1 is formed in a lower portion of tool horn 29.

A control panel 35 for setting values of various types of welding conditions is formed on a right side surface of the welding machine. An operation panel 33 for controlling the start of a vertical movement of tool horn 29 and controlling the start or the stop of oscillation applied by oscillation unit 31 is formed in an upper portion on the front side of the welding machine. An air control unit 37 for controlling pressure applied by oscillation unit 31 is attached to the left side of the front surface of a welding portion.

As a specific welding operation, with the respective end surfaces of upper cover 11 and lower cover 13 constituting speedometer 1 being correspondent with each other, upper cover 11 facing downward is attached to the concavity of receiving jig 27. Tool horn 29 is fallen or moved downward by operating operation panel 33 in such a state. Then, tool horn 29 is fallen down to a predetermined position. With the speedometer fixed between tool horn 29 and receiving jig 27, a predetermined oscillation is provided to speedometer 1 through oscillation unit 31. The oscillation provided to upper cover 11 and lower cover 13 causes projection 25 pressed to the end surface of upper cover 11 to be melted by a friction heat caused by the oscillation and then connected to the end surface of upper cover 11. Thus, welding is completed.

According to the result of a test, appropriate sizes of the shapes of a connection 15 and projection 25 are: W = 2−3mm, H = 0.4−0.6mm and $\theta = 80° − 90°$.

A ratio a/b of a depth dimension a of upper cover 11 and that b of lower cover 13 from connection 15 shown in FIG. 3 is preferably smaller than "1". This is because the oscillation caused by tool horn 29 is applied from the lower cover side to the upper cover side having a functional element.

Figure 6:
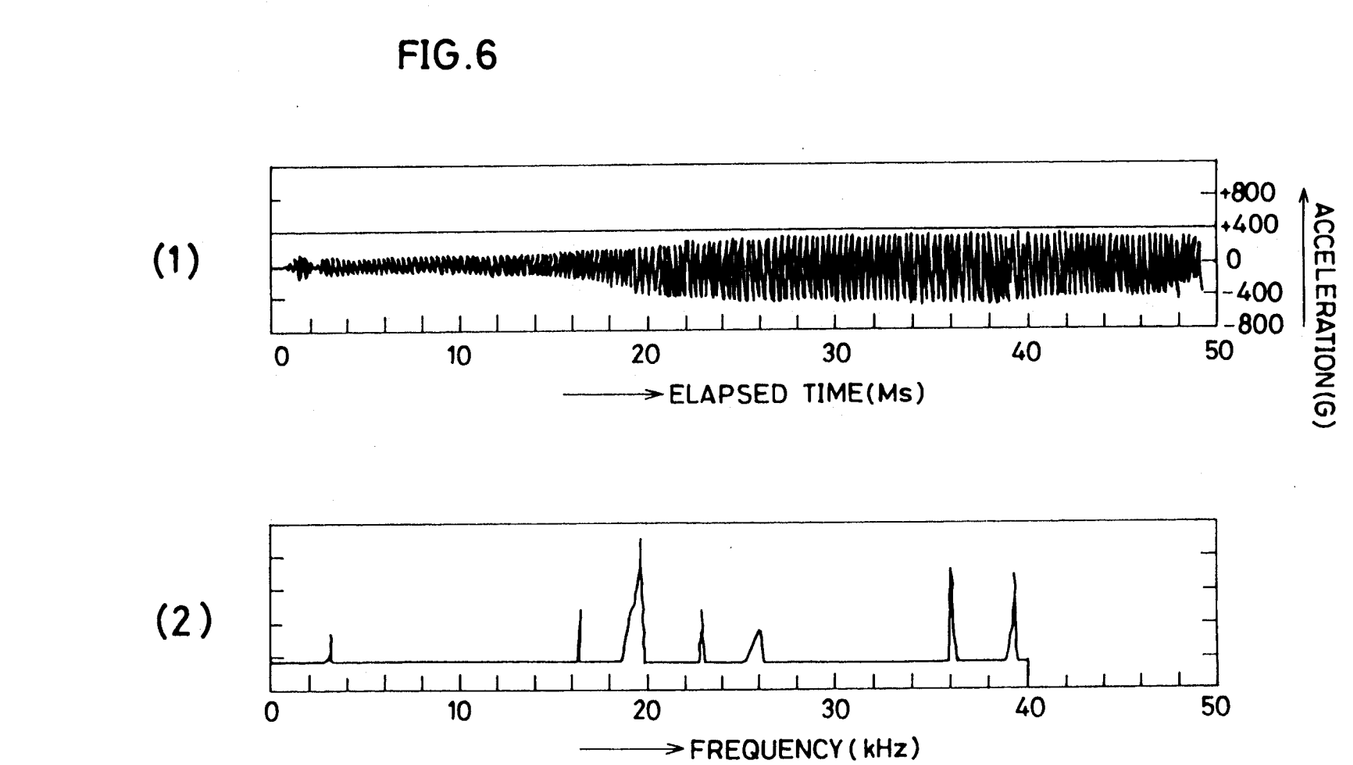
FIG. 6 shows measurement data in ultrasonic welding in the elapsed time of 0-50ms, according to the one embodiment of the present invention.
Figure 7:
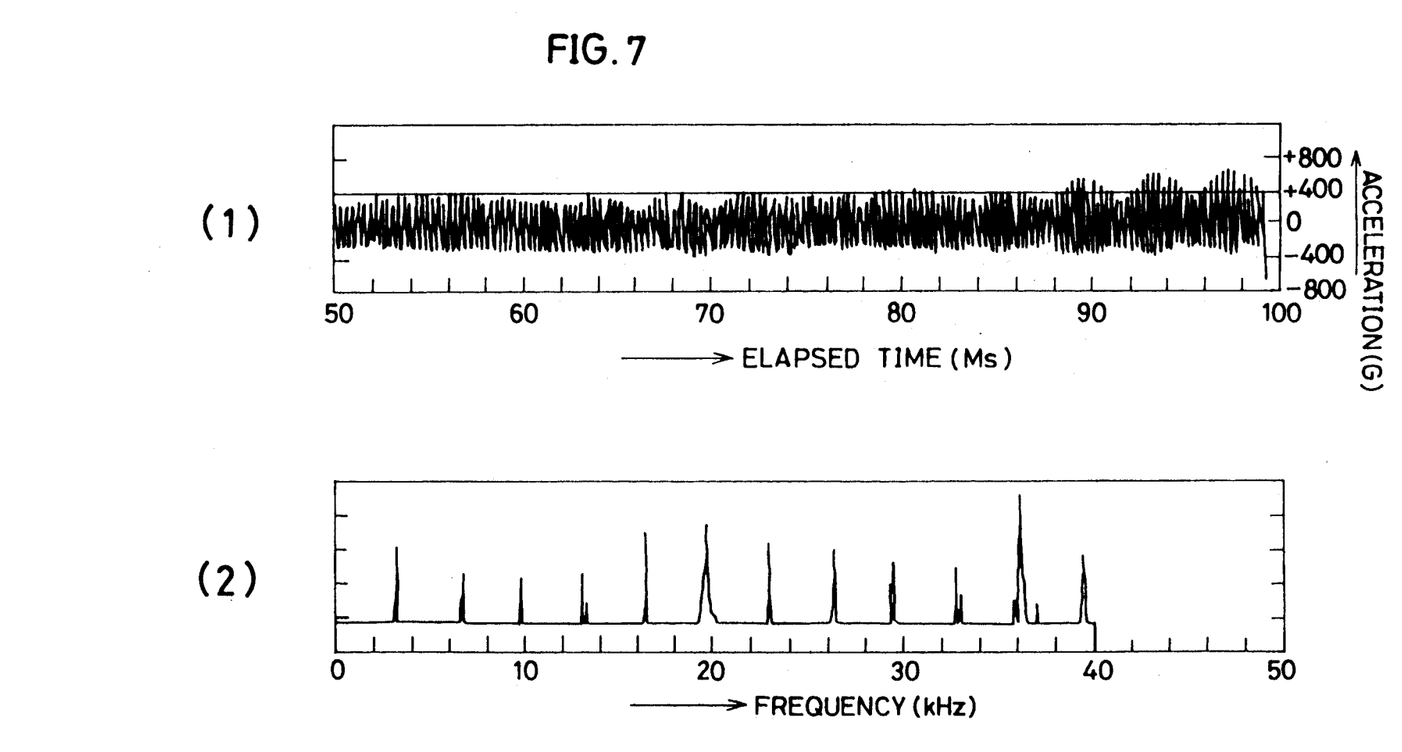
FIG. 7 shows measurement data in ultrasonic welding in the elapsed time of 50-100ms, according to the one embodiment of the present invention.
Figure 8:
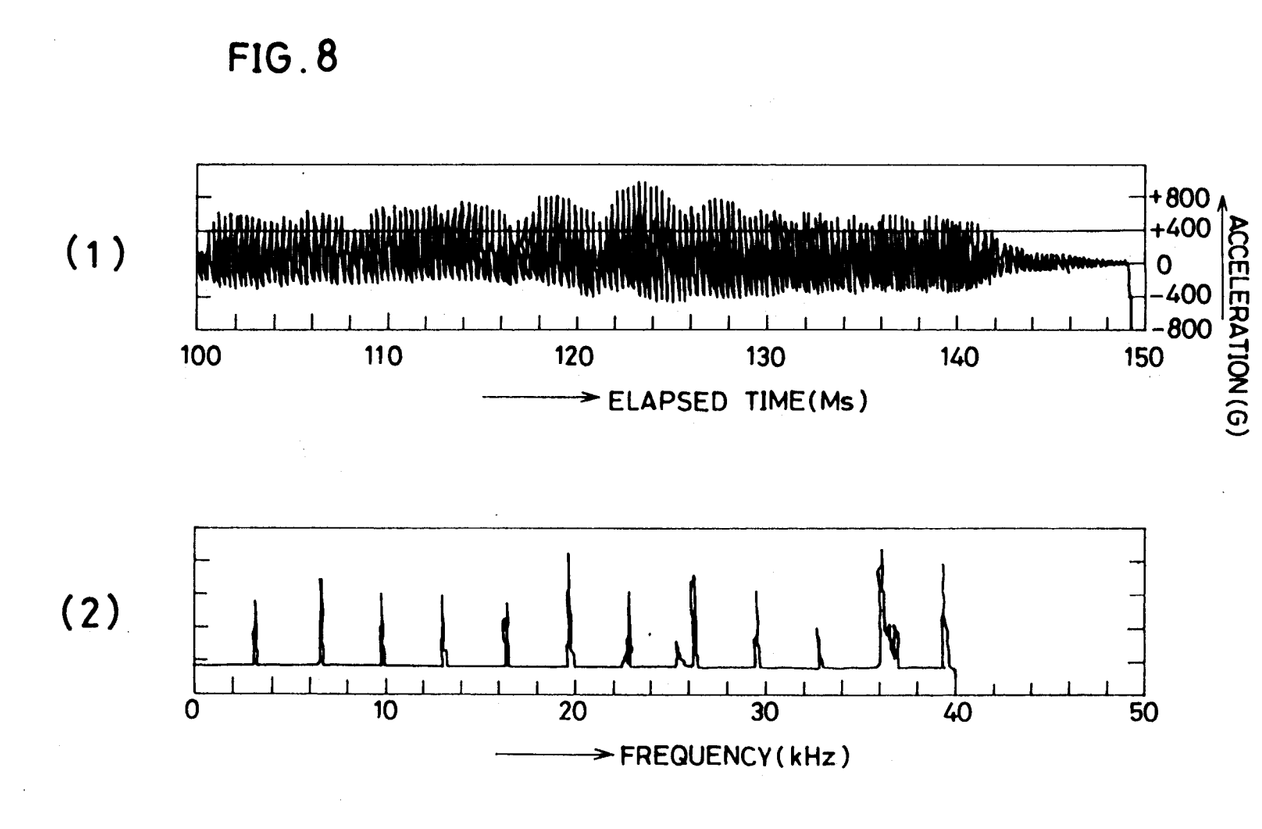
FIG. 8 shows measurement data in ultrasonic welding in the elapsed time of 100-150ms, according to the one embodiment of the present invention.

FIGS. 6–8 show measurement data provided by measuring the oscillation applied to speedometer 1 by the ultrasonic welding machine, according to the one embodiment of the present invention.

This measurement data is data obtained by attaching an acceleration sensor onto printed circuit board 21 mounted inside speedometer 1 and then measuring acceleration.

FIG. 6 (1) shows acceleration data in the elapsed time of 0–50ms, and FIG. 6 (2) shows data obtained by frequency-analyzing an oscillation applied by the ultrasonic welding machine in the above elapsed time.

FIG. 7 shows data of acceleration in the elapsed time of 50–100ms, and data obtained by frequency-analyzing the oscillation.

FIG. 8 shows acceleration data in the elapsed time of 100–150ms, and data obtained by frequency-analyzing the oscillation in the elapsed time.

The measurement data indicates one example of data provided in such a case that when an external ultrasonic oscillation is provided, such a functional element as crystal oscillator 23 in speedometer 1 is not damaged and upper cover 11 and lower cover 13 are ultrasonic-welded. If the crystal oscillator is fixed onto the base plate by adhesives or the like, an oscillation occurring during ultrasonic welding are liable to be transmitted through the printed circuit board to the crystal oscillator, so that the crystal oscillator is sometimes damaged. It is thus desirable not to fix the crystal oscillator on the printed circuit board by employing adhesives. In this example, while natural oscillation of the crystal oscillator is 32kHz, center frequency of the provided oscillation is 20kHz. Accordingly, it is considered that there are other conditions than that of such measurement data, on which no internal functional element or the like is damaged even by ultrasonic welding.

While the present invention is applied to the covers of the speedometer for the bicycle in the foregoing embodiment, the present invention is similarly applicable to parts for not only bicycles but also other two-wheeled vehicles.

While triangular projection 25 is formed on the end surface of lower cover 13 in the foregoing embodiment, such a projection may be formed on upper cover 11, and projection 25 may be of other shapes than triangle which allow ultrasonic welding.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A meter for a two-wheeled vehicle, comprising:
   a first cover having crystal oscillator means therein and having a cross-section of a shape to cover said crystal oscillator;
   a second cover corresponding to said first cover so that an end surface of said second cover can be engaged with an end surface to said first cover, and having a cross-section of a shape to cover said crystal oscillator; and a projection formed on one of the respective end surfaces of said first and second covers, wherein ultrasonic oscillation applied said first cover and said second cover will connect the covers to each other through said projection without damaging the crystal oscillator means.

2. A meter for a two-wheeled vehicle according to claim 1, wherein said projection has a triangular cross-section.

3. A meter for a two-wheeled vehicle according to claim 2, wherein said projection has a vertex angle of 80° to 90°.

4. A meter for a two-wheeled vehicle according to claim 1, wherein said projection is formed on the end surface of said second cover.

5. A meter for a two-wheeled vehicle, said meter including a crystal oscillator housed within a housing that includes a first cover and a second cover, the first cover and the second cover each being constructed and arranged so as to enclose and retain the crystal oscillator but not being bonded thereto, an end surface of the second cover being complementary to and engaging an end surface of the first cover, a projection formed on at least one of the respective end surfaces, whereby ultrasonic oscillation applied to melt the projection will connect the first and second covers by ultrasonic welding without damaging the liquid crystal.

6. A meter as in claim 5 wherein said projection has a triangular cross-section.

7. A meter as in claim 6 wherein said projection has a vertex angle of 80° to 90°.

8. A meter as in claim 7 wherein the projection is formed on the end surface of the second cover and the ultrasonic oscillation is applied to the first cover.

* * * * *

UNITED STATES PATENT AND TRADEMARK OFFICE
CERTIFICATE OF CORRECTION

PATENT NO. : 5,236,759
DATED : August 17, 1993
INVENTOR(S) : SAKURAI, Nobuo It is certified that error appears in the above-identified patent and that said Letters Patent is hereby corrected as shown below:

The words "Liquid Crystal" in the title on the cover page should read -- Crystal Oscillator --;

The words "Liquid Crystal" in the title in Column 1 should read -- Crystal Oscillator --;

Column 4 line 63 add --means-- after "oscillator";

Column 4 line 68, add -- means -- after "oscillator";

Column 6 line 9, change "liquid crystal" to -- liquid oscillator".

Signed and Sealed this

Sixth Day of September, 1994

Attest:

BRUCE LEHMAN

*Attesting Officer*    *Commissioner of Patents and Trademarks*